(12) United States Patent
Winslow

(10) Patent No.: US 9,169,694 B2
(45) Date of Patent: Oct. 27, 2015

(54) POSITIONABLE DOWNHOLE GEAR BOX

(71) Applicant: Halliburton Energy Services, Inc., Houston, TX (US)

(72) Inventor: Daniel Martin Winslow, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 15 days.

(21) Appl. No.: 14/342,309

(22) PCT Filed: May 10, 2013

(86) PCT No.: PCT/US2013/040544
§ 371 (c)(1),
(2) Date: Feb. 28, 2014

(87) PCT Pub. No.: WO2014/182312
PCT Pub. Date: Nov. 13, 2014

(65) Prior Publication Data
US 2015/0083496 A1 Mar. 26, 2015

(51) Int. Cl.
| | |
|---|---|
| *F16H 57/08* | (2006.01) |
| *E21B 4/00* | (2006.01) |
| *E21B 7/06* | (2006.01) |
| *E21B 4/02* | (2006.01) |

(52) U.S. Cl.
CPC . *E21B 4/006* (2013.01); *E21B 4/02* (2013.01); *E21B 7/068* (2013.01); *F16H 57/082* (2013.01)

(58) Field of Classification Search
CPC ....... F16H 57/08; F16H 57/082; E21B 4/006; E21B 7/068
See application file for complete search history.

(56) References Cited

U.S. PATENT DOCUMENTS

| | | | |
|---|---|---|---|
| 6,334,486 B1 | 1/2002 | Carmody et al. | |
| 6,629,570 B1 | 10/2003 | Head | |
| 6,966,391 B2 | 11/2005 | Tang | |
| 7,464,750 B2 | 12/2008 | Schepel et al. | |
| 2007/0125578 A1* | 6/2007 | McDonald et al. | 175/107 |
| 2010/0212967 A1* | 8/2010 | Powell et al. | 175/106 |
| 2014/0060935 A1* | 3/2014 | Winslow et al. | 175/61 |

FOREIGN PATENT DOCUMENTS

WO    WO 2012/143807    10/2012

OTHER PUBLICATIONS

International Search Report and Written Opinion of the International Searching Authority issued in International Application No. PCT/US2013/040544 on Feb. 5, 2013; 13 pages.

* cited by examiner

*Primary Examiner* — Derek D Knight
(74) *Attorney, Agent, or Firm* — Alan Bryson; Fish & Richardson P.C.

(57) ABSTRACT

The subject matter of this specification can be embodied in, among other things, a tool string positionable in a wellbore that includes a spur gear driven by a source of input rotation, a planetary gearbox having an attachment structure to connect to the spur gear. The gearbox includes a central sun gear, a collection of planet gears disposed in a planet gear carrier disposed around the central sun gear, and a ring gear disposed around the planet gears and planet gear carrier. The attachment structure drives a hydraulic pump or electrical generator at a rotational speed different than a rotational speed of the source of input rotation.

18 Claims, 3 Drawing Sheets

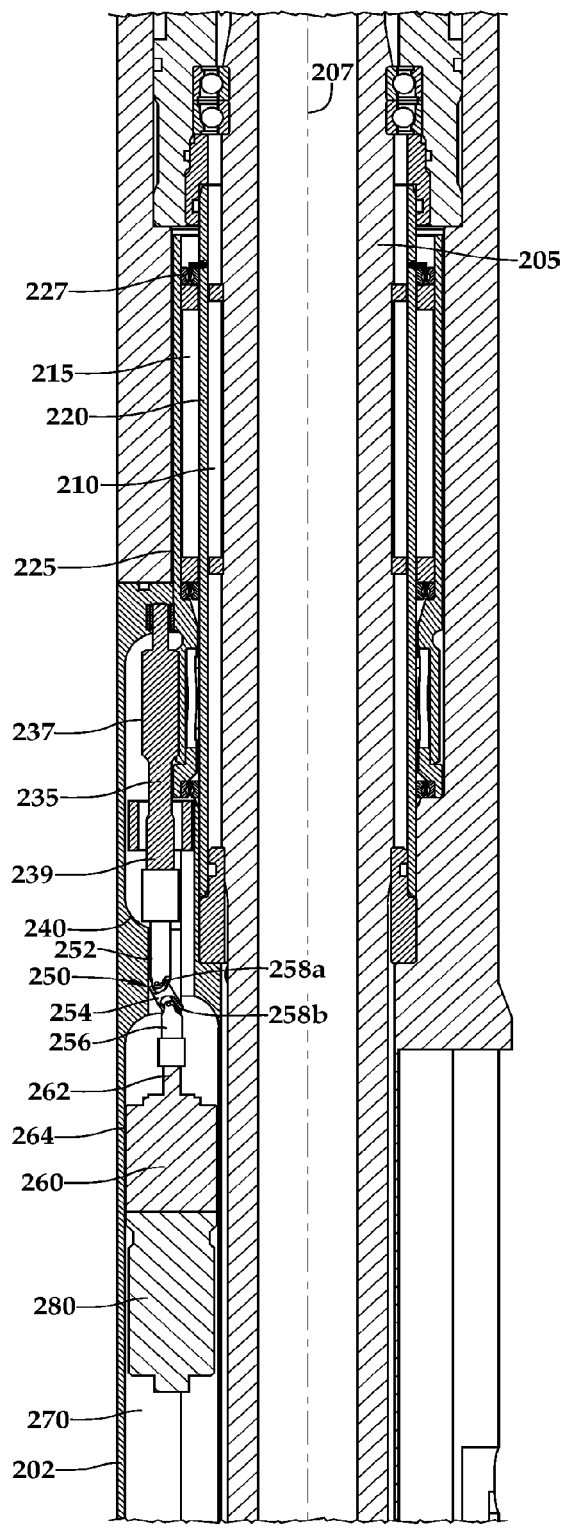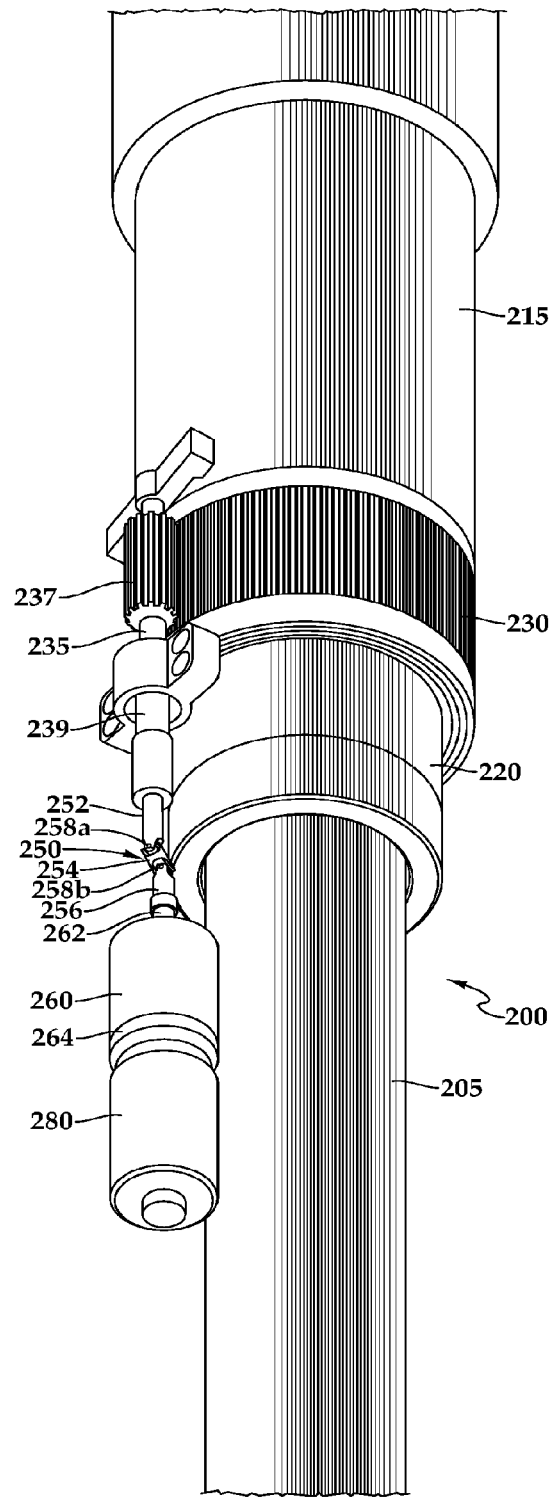
*Fig.2A*  *Fig.2B*

POSITIONABLE DOWNHOLE GEAR BOX

CLAIM OF PRIORITY

This application is a U.S. National Stage of PCT/US2013/040544 filed on Jan. May 10, 2013.

TECHNICAL FIELD

The present disclosure relates to systems, assemblies, and methods for a gearbox for a tool string positionable in a wellbore.

BACKGROUND

In oil and gas exploration, it is important to provide rotational energy to downhole tools connected to a drill string. In some implementations, a drilling rig located at or above the surface rotates a drill string disposed in the wellbore below the surface. The surface equipment on the drilling rig rotates the drill string and the drill bit as it bores into the Earth's crust to form a wellbore. In some implementations, the drill string may include a downhole power section (e.g., positive displacement mud motor) that includes a stator and a rotor that are rotated and transfer torque to a drill bit or other downhole equipment (referred to generally as the "tool string") disposed below the downhole power section. In some implementations, both surface and downhole sources of rotations are used (e.g., the surface equipment rotates the stator connected to the drill string, and the rotor of the positive displacement downhole motor is rotated due to a fluid pressure differential of the pumped drilling fluid flowing across the power section relative to the stator.

DESCRIPTION OF DRAWINGS

FIG. 2A is a cutaway profile view of an example gearbox positionable in a wellbore.

FIG. 2B is a partial perspective view of an example gearbox.

DETAILED DESCRIPTION

Figure 1:
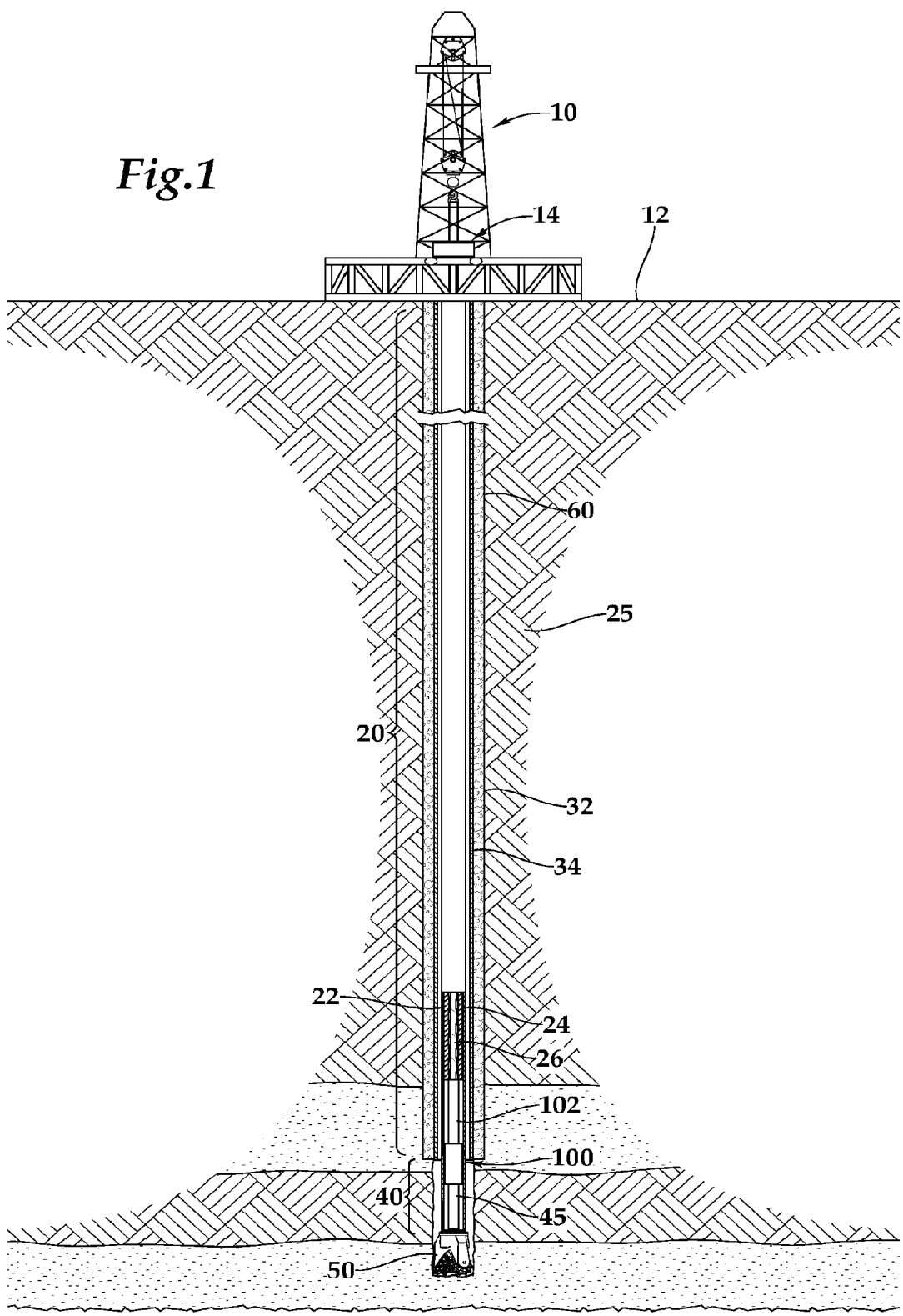
FIG. 1 is a schematic illustration of a drilling rig and downhole equipment including a downhole power section and a gearbox disposed in a wellbore.

Referring to FIG. 1, in general, a drilling rig 10 located at or above the surface 12 rotates a drill string 20 disposed in a wellbore 60 below the surface. The drill string 20 typically includes a power section 22 of a downhole positive displacement motor (e.g., a Moineau type motor), which includes a stator 24 and a rotor 26 that are rotated and transfer torque down the borehole to a drill bit 50 or other downhole equipment 40 (referred to generally as the "tool string") attached to a longitudinal output shaft 45 of the downhole positive displacement motor. The wellbore 60 is reinforced by a casing 34 and a cement sheath 32 in the annulus between the casing 34 and the borehole. During the normal operation, the surface equipment 14 rotates the stator 24 which is connected to the drill string 20, and the rotor 26 of the power section is rotated relative to the stator 24 due to a pumped drilling fluid flowing through the power section 22 (e.g., positive displacement mud motor). Rotation of the rotor 26 rotates an output shaft 102, which is used to energize components of the tool string 40 disposed below the power section.

Energy generated by a rotating shaft in a downhole power section can be used to drive a variety of downhole tool functions. Components of the tool string 40 may be energized by mechanical (e.g., rotational) energy, electrical power, fluid (e.g., hydraulic) power, or other energy that can be converted from the rotation of the rotor. However, the rotation rate of such a shaft is often either too fast or too slow to directly drive a given downhole function. By inserting a gearbox 100 between the output shaft 102 and an output shaft 45 which powers the function to be driven, the rate of rotation can be altered for the driven function, thereby improving overall performance of the function. In some cases, altering the driving rotation rate can allow for a reduction in component size.

In some downhole embodiments, the output shaft 102 rotates at a rate that is substantially higher than a desired rotation rate for a tool component. For example, the output shaft 102 may rotate at 120 revolutions per minute or RPM, while a desired rotation rate of a rotary steerable tool face control sleeve may be 2 RPM. In such embodiments, the gearbox 100 may include gearing adapted to provide reduced rotational speed relative to the output shaft 102 rotation rate.

In some downhole embodiments, the output shaft 102 rotates at a rate that is substantially slower than a desired rotation rate for a tool component. For example, the output shaft 102 may rotate at 120 RPM, while a hydraulic pump can operate at a much higher rate of rotation, such as 5000 RPM. In such embodiments, the gearbox 100 may include gearing adapted to provide increased rotational speed relative to the output shaft 102 rotation rate.

FIGS. 2A and 2B are cutaway profile and partial perspective views of an example downhole gearbox 200. In some implementations, the gearbox 200 can be the gearbox 100 of FIG. 1. The gearbox 200 includes a housing assembly 202 and a rotatable drive shaft 205 substantially oriented along a longitudinal axis 207. In some implementations, the drive shaft 205 can be rotated by the output shaft 102 of the rotor 26 about the axis 207.

About the periphery of the drive shaft 205 is a first magnetic coupler 210. The first magnetic coupler 210 includes a collection of magnets arranged about the periphery of the drive shaft 205. A second magnetic coupler 215, located substantially adjacent to the first magnetic coupler 210, also includes a collection of magnets arranged such that the second magnetic coupler 215 is magnetically coupled to the first magnetic coupler 210 across a substantially non-magnetic membrane 220. Rotation of the drive shaft 205 rotates the first magnetic coupler 210, which in turn urges rotation of the second magnetic coupler 215.

In some implementations, the membrane 220 may provide protection from contaminants found downhole. For example, the drive shaft 205 and/or the first magnetic coupler 210 may be exposed to drilling fluid, water, formations cuttings, and/or other contaminants in the drilling fluid. The membrane 220 allows rotating magnetic flux from the first magnetic coupler 210 to pass and urge rotation of the second magnetic coupler 215 while preventing downhole contaminants from reaching the second magnetic coupler 215 or other components of the example gearbox 200 that will be described below.

The second magnetic coupler 215 is rotationally coupled to a drive sleeve 225. The drive sleeve 225 is a substantially cylindrical assembly that can rotate about the axis 207 in a cavity 227 formed within the housing assembly 202 and protected from downhole contaminants by the membrane 220.

The drive sleeve 225 includes a collection of gear teeth 230 radiating outward from the outer periphery of the drive sleeve 225. The gear teeth 230 are formed to mate with a collection of gear teeth 237 and drive the rotation of a spur gear 235 located within a cavity 240 of the housing assembly 202. The spur gear 235 includes an output shaft 239 that also rotates as the spur gear 235 is driven.

The example downhole gearbox 200 also includes a planetary gearbox assembly 260, e.g., on epicyclic gear assembly, located within a cavity 270 of the housing assembly 202. The planetary gearbox assembly 260 includes a housing 264 and an input shaft 262 is rotationally coupled to the output shaft 239 by a jointed drive shaft 250. The jointed drive shaft 250 includes an input section 252 rotationally coupled to the output shaft 239, a middle section 254, an output section 256 rotationally coupled 10 the input shaft 262, a universal joint 258a rotationally coupling the input section with the middle section, and a universal joint 258b rotationally coupling the middle section 254 with the output section 256. In some embodiments, the jointed drive shaft 250 may rotationally couple the spur gear 235 to the planetary gearbox assembly 260 across a flexible joint. For example, the planetary gearbox assembly 260 may be installed in a steerable tool head, across an articulated joint from where the spur gear 235 is located. In use, the jointed drive shaft 250 can transmit rotational energy from the spur gear 235 to the planetary gear box assembly 260 as movement of the articulated joint causes the axes of the output shaft 239 and the input shaft 262 to become offset or angled relative to each other.

Figure 3:
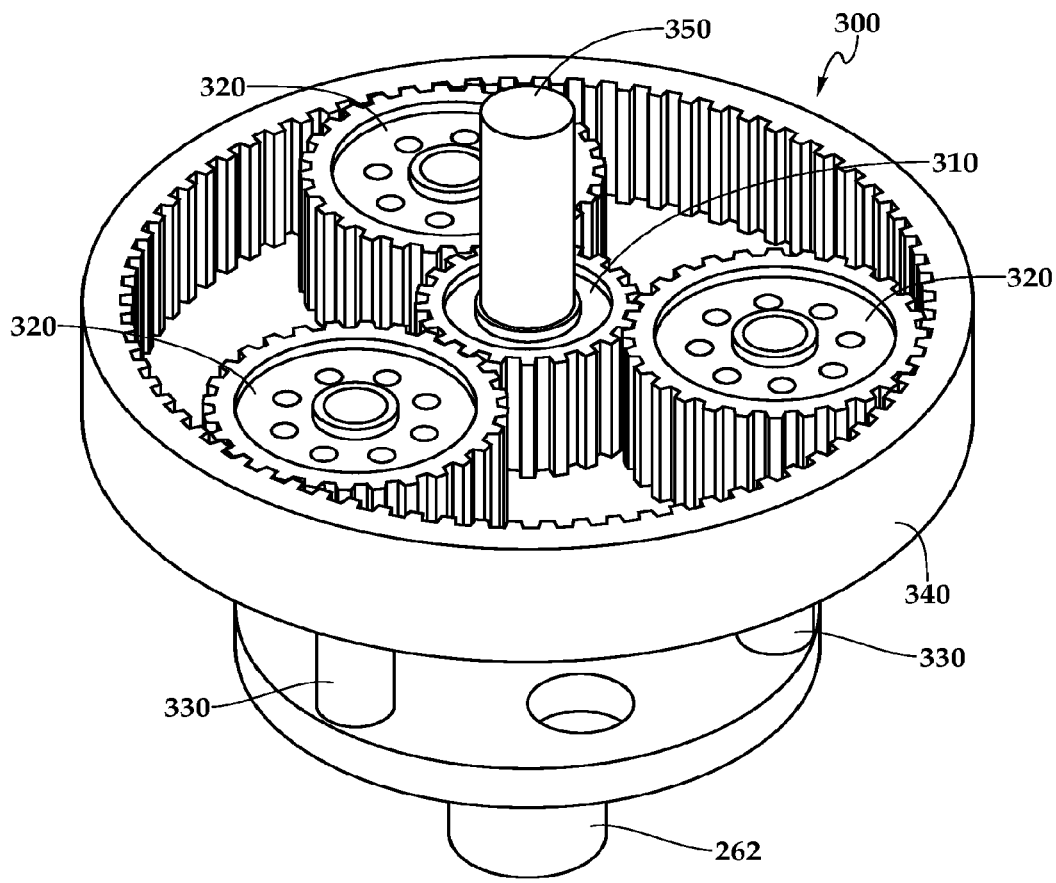
FIG. 3 is a perspective view of an example planetary gear system.

Referring now to FIG. 3, an example planetary gearbox 300 is illustrated. In some embodiments, the planetary gearbox 300 can be included in the planetary gearbox assembly 260. The planetary gearboxes 300 include a sun gear 310, a collection of planet gears 320 on a planet gear carrier 330, and a ring gear 340. The planet gear carrier 330 is rotationally coupled to and is driven by the input shaft 262. The sun gear 310 is rotationally coupled to and drives an output shaft 350. In general, when the planet gear carrier 330 is rotated by the input shaft 262 and the ring gear 340 is held stationary, the planet gears 320 will revolve around the sun gear 310. The revolution of the planet gears 320 rotates the sun gear 310 and the output shaft 350 at a rotational speed that is higher than that of the input shaft 262 and the planet gear carrier 330. In the example of the planetary gearbox assembly 260, the ring gear 340 is formed about the interior of the housing 264, which is held substantially stationary. When the input shaft 262 is rotated, the planetary gearbox 300 increases rotational speed at the output shaft 350. In some embodiments, multiple stages of planetary gearboxes can be used for higher speed reduction.

Referring back to FIGS. 2A and 2B, the rotation of the output shaft 350 (not visible in these views) drives the rotation of an output assembly 280. In some implementations, the output assembly 280 can be a fluid pump. For example, rotation of the drive shaft 205 at a first speed, e.g., about 120 RPM, can be transferred through the magnetic couplers 210, 215, the spur gear 235, and the planetary gearbox assembly 260 to spin a fluid pump at a second, generally higher speed, e.g., 5000 RPM. The fluid pump can provide pressurized fluids for use by downhole fluid actuators, e.g., hydraulic actuators.

In some implementations, the output assembly 280 can be an electrical generator. For example, rotation of the drive shaft 205 at a first speed, e.g., about 120 RPM, can be transferred through the magnetic couplers 210, 215, the spur gear 235, and the planetary gearbox assembly 260 to spin a generator at a second, generally higher speed to produce electrical energy that can be used to drive downhole electronics and electrical components.

In some implementations, the planetary gearbox assembly 260 may be configured to reduce the speed of the input shaft 262 and provide the reduced rotational speed through the output shaft 350. For example, the planetary gearbox 300 may accept rotational energy at the output shaft 350 to drive the sun gear 310 while the ring gear 340 is held substantially stationary. Rotation of the sun gear 310 drives the revolution of the planet gears 320 about the sun gear 310, which in turn drives the rotation of the planet gear carrier 330. Rotation of the planet gear carrier 330 at an input speed drives the rotation of the outputshaft 350 at a speed that is reduced compared to the input speed. In such implementations, a rotational speed can be reduced. For example, the planetary gearbox assembly 260 can be configured for speed reduction, and can be used as a speed reducer to manipulate downhole tool faces and offset magnitudes.

In another example, the planetary gearbox assembly 260 can used to increase the amount of torque being provided from a rotational input. For example the planetary gearbox assembly 260, as depicted in FIG. 2, is indirectly coupled to the drive shaft 250 through the magnetic couplers 210 and 215. In some example magnetic couplers, the amount of torque that can be transferred can be limited due to the non-contacting nature of magnetic couplers. Implementations of the planetary gearbox assembly 260 as a speed reducer can help by amplifying the torque provided through the magnetic coupler to a rotational load. In some embodiments, multiple stages can be used for higher speed reduction.

Figure 4:
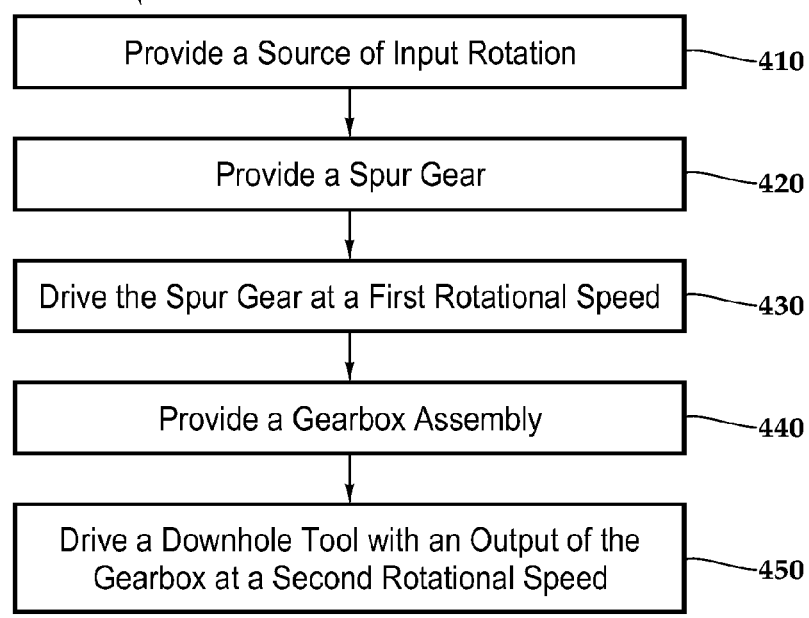
FIG. 4 is a flow chart of an example process for driving a gear system of a tool string positionable in a wellbore.

FIG. 4 is a flow chart of an example process 400 for driving a downhole tool with a downhole gearbox. In some implementations, the process 400 can be performed using the example downhole gearbox 200 of FIGS. 2A and 2B.

At 410, an input source of rotation is provided. For example, the rotor 26 of FIG. 1 can be rotated to provide the input source of rotation.

At 420, a spur gear is provided. For example, the spur gear 235 of FIGS. 2A and 2B of the example downhole gearbox 200 can be provided.

At 430, the spur gear is driven with the source of input rotation at a first rotational speed. For example, the rotation of the rotor 26 can be connected, directly or indirectly, to the spur gear 235 to transfer rotation of the rotor 26 to the spur gear 235.

In some implementations, the spur gear may be driven with a magnetic coupling driven by the source of input rotation. In some implementations, the magnetic coupling can include a first magnetic rotor, a second magnetic rotor having gear teeth formed to engage with and drive the spur gear, a gap between the first magnetic rotor and the second magnetic rotor, and a non-magnetic membrane partly filling the gap. In some implementations, driving the spur gear with the magnetic coupling can include driving a first magnetic rotor with the source of input rotation to rotate a field of magnetic flux, and transferring rotation of the first magnetic rotor to the second magnetic rotor across the gap by the field of magnetic flux. For example, the magnetic coupler 210 of the example gearbox 200 may be coupled to a source of input rotation, such as the rotor 26. The magnetic coupler 210 will rotate a magnetic field which can penetrate the membrane 220 to urge rotation of the magnetic coupler 215.

At 440, a gearbox assembly is provided. The gearbox assembly includes a central sun gear, a collection of planet gears disposed in a planet gear carrier that is disposed about the central sun gear, and a ring gear disposed around the planet gears and the planet gear carrier. For example, the example planetary gearbox 300 of FIG. 3 may be provided. In some implementations, the plurality of planet gears can include at least six planet gears.

At 450, a downhole tool is driven with an output of the gearbox at a second rotational speed. For example, the spur gear 235 can drive the input shaft 262 of the gearbox 300, and the output shaft 350 can drive the output assembly 280 at the same or a different speed relative to that of the rotor 26.

In some implementations, driving the downhole tool can include driving a downhole fluid pump at a second rotational speed greater than a first rotational speed of the rotational input. In some implementations, driving the downhole tool can include driving a downhole electrical generator at a second rotational speed greater than a first rotational speed of the rotational input.

In some implementations, driving the gearbox with an output of the spur gear can include driving the central sun gear with the output of the spur gear, driving the plurality of planet gears about the ring gear with the sun gear, driving a planet gear carrier with the planet gears, and driving the output of the gearbox with an output of the planet gear carrier. For example, the input shaft 262 of the example gearbox 300 can be driven at a first speed, and the gearbox 300 can transfer the rotation to the output shaft 350 at another speed greater, less than, or equal to the input speed.

In some implementations, driving the gearbox can include rotating an output shaft connected at a first end to the spur gear. The shaft can be coupled to a rotatable attachment structure at a second end, rotating the rotatable attachment structure coupled an input shaft of the gearbox. In some implementations, the rotatable attachment structure can be a universal joint. For example, the universal joint 250 can transfer rotation of the spur gear 235 to the input shaft 262.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A gear system of a tool string positionable in a wellbore comprising:
    a source of input rotation;
        a spur gear drivable by the source of input rotation;
        an attachment structure coupled at a first end to an output of the spur gear and coupled at a second end to an input of a gearbox, said gear box including:
        a central sun gear;
        a plurality of planet gears disposed in a planet gear carrier disposed around the central sun gear; and
        a ring gear disposed around the planet gears and planet gear carrier;
        wherein a rotation of the planet gear carrier drives a down hole tool at a rotational speed different than a rotational speed of the source of input rotation.

2. The gear system of claim 1 wherein the plurality of planet gears comprises at least six planet gears.

3. The gear system of claim 1 wherein the source of input rotation comprises a rotating drive shaft that is directly connected to the spur gear.

4. The gear system of claim 1 wherein the attachment structure comprises a universal joint.

5. The gear system of claim 1 further comprising a magnetic coupling driven by the source of input rotation and driving the spur gear.

6. The gear system of claim 5, wherein the magnetic coupling comprises a first magnetic rotor rotationally driven by the source of input rotation, a second magnetic rotor having gear teeth formed to engage with and drive the spur gear, and a non-magnetic membrane, wherein rotation of the first magnetic rotor is transferred to the second magnetic rotor by magnetic flux across a gap partly filled by the non-magnetic membrane.

7. The gear system of claim 1, further including an external housing enclosing the spur gear, the attachment structure and the gear box.

8. The gear system of claim 1, wherein the driven downhole tool is a downhole hydraulic pump that is driven at a rotational speed greater than the rotational speed of the source of input rotation.

9. The gear system of claim 1, wherein the driven downhole tool is a downhole electrical generator that is driven at a rotational speed greater than the rotational speed of the source of input rotation.

10. A method of driving a gear system of a tool string positionable in a wellbore comprising:
    providing a source of input rotation rotating at a first rotational speed;
    providing a spur gear;
    driving the spur gear with the source of input rotation;
    providing a gearbox assembly including:
        a central sun gear;
        a plurality of planet gears disposed in a planet gear carrier disposed around the central sun gear; and
        a ring gear disposed around the planet gears and the planet gear carrier;
    driving a gearbox with an output of the spur gear; and
    driving a downhole tool with an output of the gearbox at a second rotational speed.

11. The method of claim 10, wherein driving the downhole tool comprises driving a downhole fluid pump at the second rotational speed, wherein the second rotational speed is greater than the first rotational speed of the rotational input.

12. The method of claim 10, wherein driving the downhole tool comprises driving a downhole electrical generator at a second rotational speed greater than a first rotational speed of the rotational input.

13. The method of claim 10, wherein the plurality of planet gears comprises at least six planet gears.

14. The method of claim 10, wherein driving the gearbox with an output of the spur gear comprises:
    driving the central sun gear with the output of the spur gear;
    driving the plurality of planet gears about the ring gear with the sun gear;
    driving a planet gear carrier with the planet gears; and
    driving the output of the gearbox with an output of the planet gear carrier.

15. The method of claim 10, wherein driving the gearbox comprises rotating an output shaft connected at a first end to the spur gear, said shaft coupled to a rotatable attachment structure at a second end, rotating the rotatable attachment structure coupled to an input shaft of the gearbox.

16. The method of claim 15 wherein the rotatable attachment structure comprises a universal joint.

17. The method of claim 10 further comprising driving the spur gear with a magnetic coupling driven by the source of input rotation.

18. The method of claim 17 wherein the magnetic coupling comprises:

a first magnetic rotor;
a second magnetic rotor having gear teeth formed to engage with and drive the spur gear;
a gap between the first magnetic rotor and the second magnetic rotor; and
a non-magnetic membrane partly filling the gap;
wherein driving the spur gear with the magnetic coupling comprises:
   driving a first magnetic rotor with the source of input rotation to rotate a field of magnetic flux; and
   transferring rotation of the first magnetic rotor to the second magnetic rotor across the gap by the field of magnetic flux.

\* \* \* \* \*